Aug. 2, 1966 W. R. WANESKY 3,263,841
METHODS AND APPARATUS FOR REMOVING ARTICLES
FROM NESTS IN A WORK HOLDER
Filed Oct. 1, 1964 3 Sheets-Sheet 1

INVENTOR
W.R. WANESKY
By J. L. Landis
ATTORNEY

Aug. 2, 1966  W. R. WANESKY  3,263,841
METHODS AND APPARATUS FOR REMOVING ARTICLES
FROM NESTS IN A WORK HOLDER
Filed Oct. 1, 1964  3 Sheets-Sheet 2

Aug. 2, 1966    W. R. WANESKY    3,263,841
METHODS AND APPARATUS FOR REMOVING ARTICLES
FROM NESTS IN A WORK HOLDER
Filed Oct. 1, 1964    3 Sheets-Sheet 3

United States Patent Office 3,263,841
Patented August 2, 1966

3,263,841
METHODS AND APPARATUS FOR REMOVING ARTICLES FROM NESTS IN A WORK HOLDER
William R. Wanesky, Emmaus, Pa., assignor to Western Electric Company, Incorporated, New York, N.Y., a corporation of New York
Filed Oct. 1, 1964, Ser. No. 400,645
15 Claims. (Cl. 214—300)

The present invention relates generally to methods of and apparatus for removing articles from nests in a work holder, and more particularly to the mass removal of a plurality of small components from closely spaced nests in a work holder. Accordingly, the general objects of the invention are to provide new and improved methods and apparatus of such character.

In the manufacture of miniature electrical components, such as transistors, it is frequently desirable for economic manufacture to provide systems for the mass processing of large numbers of small parts, such as transistor headers, in which the parts are closely spaced in nests or seats in a work holder or carrier of some type. The close spacing permits a large number of the parts to be processed simultaneously with a minimum size of processing equipment; however, at a later time, it becomes necessary to remove the parts from the nests, and the close spacing makes individual removal of the parts difficult.

Another object of the invention is to provide new and improved methods and apparatus for removing a plurality of articles from a plurality of receiving nests in a work holder in two stages, such that half of the articles comprising every other one are removed in the first stage and the remaining half are removed in the second stage. This spaces the articles further apart than formerly to facilitate individual handling of the articles.

A related object of the invention is to provide new and improved methods and apparatus for removing articles in two such stages from a work holder having nests arranged at equally spaced intervals in a square grid pattern having an identical even number of rows and columns. This is a particularly common arrangement which permits close packing of the articles.

Another object of the invention is to provide methods and apparatus for removing articles from nests in a work holder, using attractive pick-up members such as magnets, in such a manner as to prevent contact between the pick-up members and the articles so as to prevent damage to the articles.

The foregoing and other objects are accomplished, in accordance with certain features of the invention, by providing a transfer plate having a plurality of article pick-up members thereon. The pick-up members are equal in number to half the number of nests in the work holder, and are arranged on the transfer plate in a predetermined pattern which is based on the pattern of the nests. The pattern of the pick-up members is such that they may be aligned with half of the articles comprising every other one by positioning the transfer plate opposite to the work holder in a first orientation. Conversely, the pick-up members may be aligned with the remaining half of the articles by positioning the transfer plate opposite to the work holder in a second orientation. To remove the articles, the work holder and the transfer plate in the first orientation are moved relatively together and then apart, so that the pick-up members remove the first half of the articles from the holder. After this, the first half of the articles (now spaced twice as far apart as they were) are detached from the pick-up members, the transfer plate is positioned in the second orientation, and the remaining half of the articles are removed from the holder in similar fashion.

When the square grid pattern of nests is involved, the pick-up members are arranged on the transfer plate in an equally spaced checkerboard pattern corresponding to half of the nests. Preferably, the pick-up members comprise elements, such as magnets, capable of attracting the articles out of the nests toward the pick-up members. Magnets, of course, can only be used where the outer surfaces of the articles are of paramagnetic material. In this instance, it is desirable to intercept the articles as they are attracted toward the magnets to retain the articles in positions where they are spaced from the magnets to avoid damage to the articles. One preferred retaining member, for use in magnetic removal of articles, comprises an apertured retaining plate, with the magnet entering the aperture from one side and the article from the other. An enlarged portion of the article contacts the retaining plate as the article is drawn toward the magnet, and the aperture is made long enough that a clearance exists between the magnet and the article at this time.

Other objects, advantages and features of the invention will be apparent from the following detailed description of a specific embodiment thereof, when taken in conjunction with the appended drawings, in which.

GENERAL ARRANGEMENTS

Figure 1:
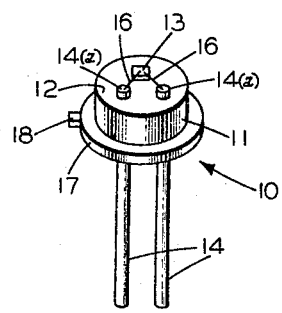
FIG. 1 is an enlarged perspective view of a transistor header to be handled in accordance with the invention.
Figure 2:
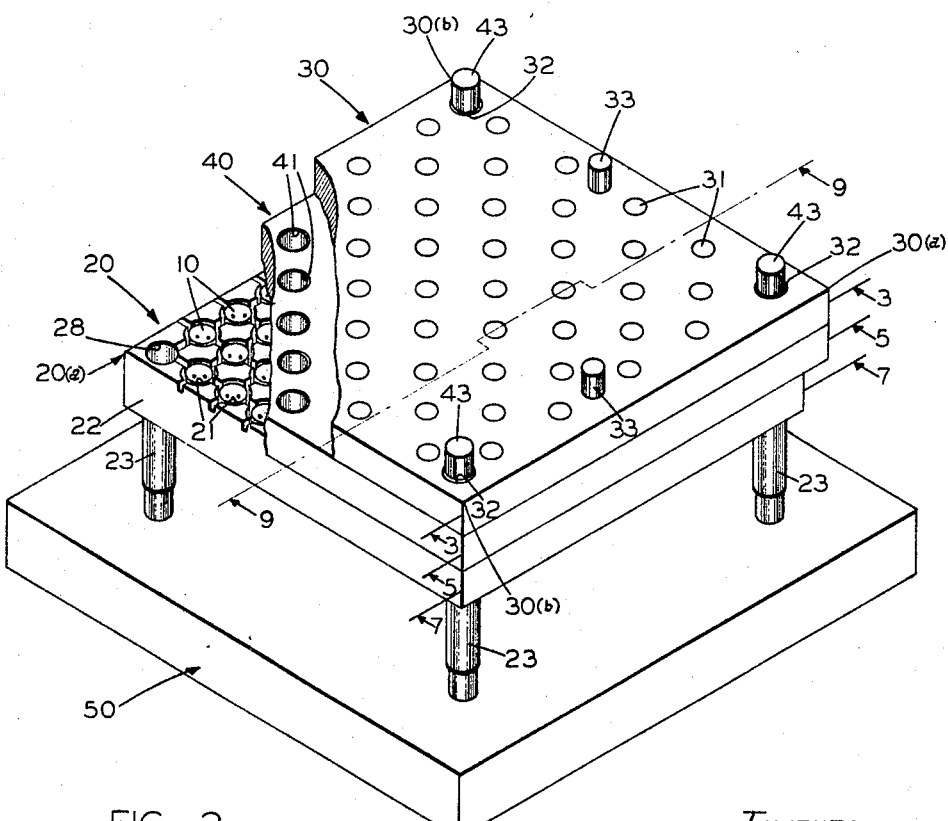
FIG. 2 is a perspective view, with portions broken away, illustrating an assembly of a transfer plate and a retaining plate in accordance with the specific embodiment of the invention, in position to remove articles from a work holder.

Referring now in detail to the drawings, and particularly to FIGS. 1 and 2, the illustrative embodiment of the invention concerns methods and apparatus for removing a plurality of transistor headers 10—10, one of which is shown greatly enlarged in FIG. 1, from a plurality of nests 21—21 formed in the upper surface of a work holder 20. The basic components of the removal apparatus include (1) a transfer plate 30 having a plurality of magnets 31—31 mounted thereon for removing the headers 10—10 from the work holder 20 and (2) a retaining plate 40 having a plurality of apertures 41—41 into which the magnets 31—31 extend and into which the individual headers 10—10 being removed are drawn by the magnets 31—31. The retaining plate 40 functions to intercept the headers 10—10 as they are attracted toward the magnets 31—31 and to retain the headers in positions where they are spaced from the magnets 31—31 to avoid damage to the upper surfaces of the headers. Also provided is a magnetic base plate 50, on which the work holder 20 is placed during removal of the headers therefrom, which insures that the headers not being removed remain in their nests.

The specific construction and operation of the various elements of the preferred embodiment of the invention will now be described in detail in the following Sections I to IV, after which the method of operation will be described in Section V and some alternative arrangements in Section VI.

I.—Structure of headers 10—10

Referring again to FIG. 1, each of the headers 10—10 includes a cylindrical upper portion, termed a "platform" 11, generally in the shape of an inverted cup having a flat upper surface 12 to which a semiconductive wafer 13 is bonded. A pair of leads 14—14 extend through spaced holes in the platform 11 and are mechanically connected thereto and insulated therefrom by a glass bead (not shown) within the platform. A pair of extremely fine gold wires 16—16 are bonded between selected areas of the wafer surface and the upper ends 14(a)—14(a) of the leads 14—14, which serve as terminal posts.

The header 10 further includes an enlarged circular flange 17 at the base of the platform 11, which is provided with a locating tab 18 projecting therefrom to provide for orientation of the header during manufacture and for subsequent identification of the individual leads 14—14. The platform 11, flange 17 and leads 14—14 are all formed of paramagnetic material, by which is meant a material capable of experiencing attraction by a magnet. In the particular example, the material used is gold-plated "Kovar," an alloy of iron, nickel and cobalt commonly used in the fabrication of transistors.

II.—Arrangement of headers in work holder 20

Figure 7:
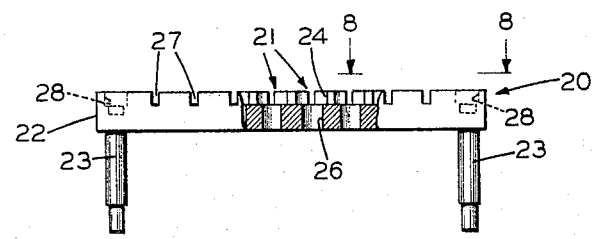
FIG. 7 is a front view, partly in section, of the work holder alone, as viewed along the line 7—7 in FIG. 2.
Figure 8:
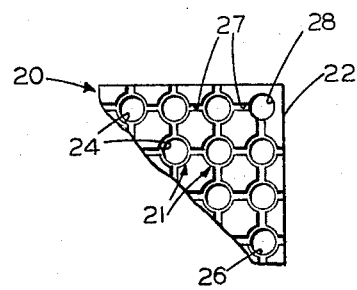
FIG. 8 is a top view of a one corner of work holder, looking along the line 8—8 of FIG. 7.
Figure 9:
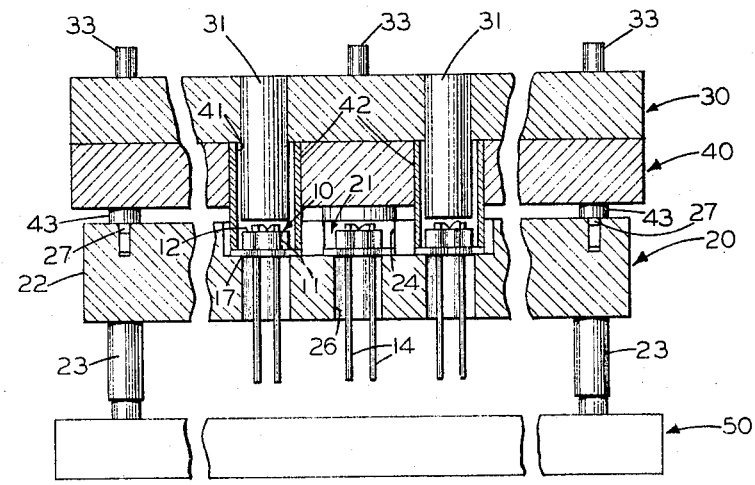
FIG. 9 is an enlarged, broken, vertical section of the assembly shown in FIG. 2, taken generally along the line 9—9 of FIG. 2.

As previously mentioned, and as indicated fragmentarily in FIG. 2, a plurality of the headers 10—10 are initially seated in nests 21—21 in the work holder 20, which is illustrated separately in FIGS. 7 and 8. At this point in the manufacturing process, the fabrication of the headers is complete, the previous step having been a baking operation in which the work holder 20 is used to support the headers with the upper surfaces 12—12 exposed. Referring to FIGS. 7 and 8, the work holder 20 comprises a flat tray 22 mounted on four supporting legs 23—23 at the corners of the tray. Referring to FIG. 9, the legs 23—23 are long enough that the depending leads 14—14 of the headers 10—10 terminate a predetermined short distance above the upper surface of the magnetic base plate 50 (about ¼" in the specific example), so that the base plate 50 attracts all of the headers 10—10 toward the bases of the nests 21—21 to insure that half of the headers will remain in their nests as the other half is removed.

The nests 21—21 are shaped in accordance with the configuration of the headers 10—10 to support the headers by the flanges 17—17 with the upper surfaces 12—12 of the headers located below the upper surface of the work holder 20, as illustrated in FIG. 9, to avoid possible damage to the headers. For this purpose, each of the nests 21—21 includes a cylindrical well 24 for receiving the flange 17 and platform 11 for sliding movement of the header into and out of the nest 21. A bore 26 of smaller diameter than the well 24 is provided below the well to receive the leads 14—14. The locating tabs 18—18 are received within one of a plurality of slots 27—27 (FIG. 8) provided between adjacent wells 24—24 to position the headers 10—10 securely in the nests 21—21 and prevent rotation of the headers in the work holder 20, the precise orientation of the headers during the baking step being immaterial. The length of each slot 27 is slightly greater than twice the length of a tab 18 to prevent possible overlapping of the tabs. The slots 27—27 have been omitted in FIG. 10 for purposes of clarity.

Figure 10:
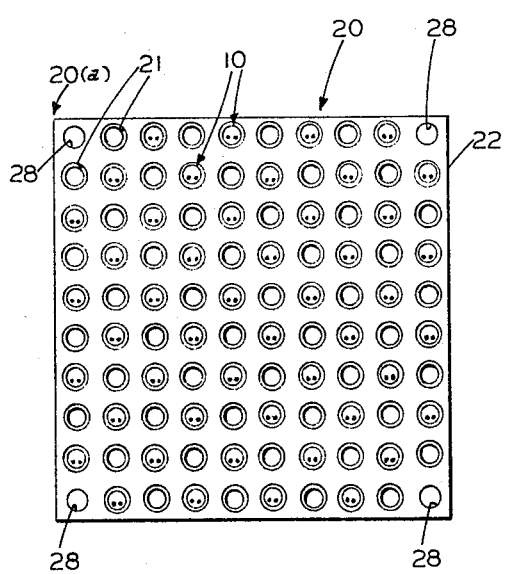
FIG. 10 is a plan view of the work holder after removal of the first half of the headers therefrom, with portions removed for clarity.

Preferably, the nests 21—21 are very closely spaced as illustrated in FIGS. 8 and 10, to provide for the simultaneous treatment of a large number of the headers in a minimum amount of space. This is a highly efficient arrangement for processing operations such as baking. The nests 21—21 are arranged in a predetermined regular pattern, preferably a square grid pattern such as is illustrated in FIG. 10, having an identical even number of rows and columns. In the example illustrated, 96 headers are processed at a time, there being ten rows of ten nests each, with the four corners having blind locating holes 28—28 (instead of nests 21—21) to provide for precise orientation of the transfer and retaining plates 30 and 40 with respect to the work holder 20, as will be described hereinafter. This also allows stacking of the holders in the oven, as the lower ends of the legs 23—23 of each holder are designed to fit in the locating holes 28—28 of the other holders.

The removal apparatus next to be described is designed for removing the headers 10—10 from the nests 21—21 with two primary objectives in mind: first, to remove the headers in two distinct stages, such that half of the headers comprising every other one are removed in the first stage and the remaining half are removed in the second stage; and, second, to remove the headers in such a manner that no contact is made between the pick-up magnets 31—31 and the upper surfaces 12—12 of the headers so as to avoid damage to the semiconductive wafer 13 and gold lead wires 16—16 (FIG. 1).

III.—Transfer plate 30

Figure 3:
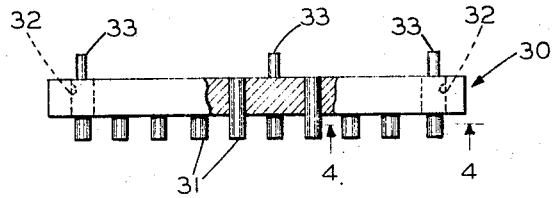
FIG. 3 is a front view, partly in section, of the transfer plate alone, as viewed along the line 3—3 in FIG. 2.
Figure 4:
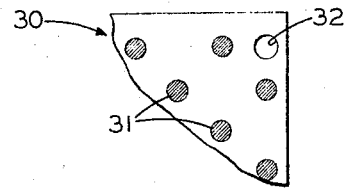
FIG. 4 is a bottom horizontal section of one corner of the transfer plate, taken generally along the line 4—4 of FIG. 3.

Referring to FIGS. 3 and 4, the headers 10—10 are removed from the nests 21—21 by clindrical magnets 31—31 mounted on the transfer plate 30 and projecting therefrom in one direction, the diameter of the magnets 31—31 being approximately equal to the diameter of the platforms 11—11 of the headers 10—10. The transfer plate 30 is a flat square plate having a surface area slightly larger than that of the work holder 20, and is made of a nonmagnetic material such as aluminum, so that the plate itself is not magnetized but serves only as a carrier for the magnets. The removal step is accomplished by moving the transfer plate 30 into and out of proximity with the work holder 20 so that each magnet attracts one of the headers and draws it out of its nest.

Figure 11:
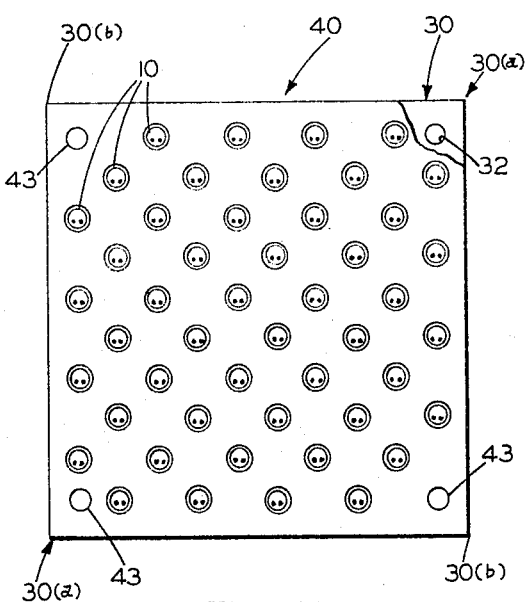
FIG. 11 is a plan view of the transfer and retaining plates at that time, after inversion thereof.

In order to provide for removal of the headers 10—10 by the magnets 31—31 in two separate stages further spaced from each other, the magnets are provided in a number equal to half the number of nests 21—21 (48 magnets in the specific example) and are arranged on the transfer plate 20 in an equally spaced checkerboard pattern corresponding to every other one of the nests, as indicated in FIG. 2 and by comparing FIG. 4 with FIG. 8 or FIG. 10 with FIG. 11. With this arrangement, the magnets 31—31 may be aligned with a first half of the headers 10—10 comprising every other one by positioning the transfer plate 30 opposite to the work holder 20 in a first orientation, such as that indicated in FIG. 2 with either of one pair of opposite corners 30(a)—30(a) opposite to a reference corner 20(a) of the work holder 20. Correspondingly, the magnets 31—31 may be aligned with the remaining half of the headers 10—10 by positioning the transfer plate 30 opposite to the work holder 20 in a second orientation rotated 90° from the first (about a vertical axis through the center of the plate 30 as viewed in FIGS. 2 and 4). In the second orientation, either of the other pair of opposite corners 30(b)—30(b) is positioned opposite to the reference corner 20(a).

The transfer plate 30 is provided with a set of four locating holes 32—32 at the four corners of the plate, corresponding to the locating holes 28—28 of the work holder 20, to provide for precise orientation of the transfer and retaining plates 30 and 40 with the work holder 20, as will be described hereinafter. The transfer plate is also equipped with a set of four support pins 33—33 projecting in the opposite direction from the magnets 31—31 to allow the transfer plate to be inverted from the position shown in FIGS. 2 and 3 and set down on the pins 33—33.

IV.—Retaining plate 40

Figure 5:
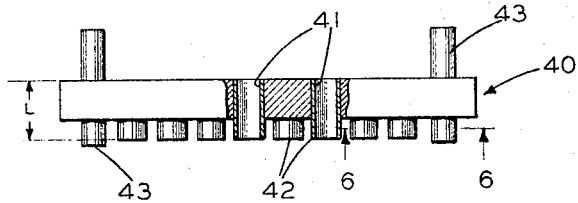
FIG. 5 is a front view, partly in section, of the retaining plate alone, as viewed along the line 5—5 in FIG. 2.
Figure 6:
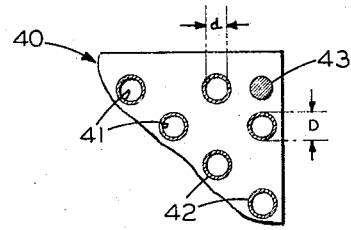
FIG. 6 is a bottom horizontal section of one corner of the retaining plate, taken generally along the line 6—6 in FIG. 5.

The principal function of the retaining plate 40, illustrated separately in FIGS. 5 and 6, is to intercept the headers 10—10 as they are drawn toward the magnets 31—31 and to retain the headers in positions where they are spaced from the magnets to avoid damage to the headers. In order to accomplish this function, the retaining plate 40 comprises a flat square plate of the same size as the transfer plate 30, and is also made of a non-magnetic material such as aluminum. The plate 40 is provided with apertures 41—41 therethrough which correspond to the magnets 31—31 in both number and spacing, as indicated by comparing FIGS. 4 and 6. In the specific embodiment illustrated, the apertures 41—41 comprise cylindrical bores formed in a plurality of cylindrical sleeves 42—42 which are secured to the plate 40 and project therefrom, as illustrated in FIG. 5.

The size and shape of the sleeves 42—42 is related to the size and shape of the headers and the nests, and is very important to the most efficient practice of the invention. The inner diameter $d$ (FIG. 6) of the sleeves 42—42 must be sufficiently large to permit partial entry of the magnets 31—31 therein when the transfer plate 30 is coupled with the retaining plate 40 as illustrated in FIG. 9. The inner diameter $d$ must also be sufficiently large to permit partial entry of the upper portions of the headers (the platforms 11—11) therein, but not entry of the enlarged portions of the headers (the flanges 17—17). Thus, referring to FIG. 9, the individual headers 10—10 being removed can be attracted upward into the corresponding sleeves 42—42, but only to the point where the flanges 17—17 lodge against the lower edges of the sleeves. The outer diameter $D$ (FIG. 6) of the sleeves 42—42 must be somewhat smaller than the diameter of the wells 24—24 of the work holder 20, so that the sleeves can be inserted into the nests 21—21 to envelop the upper portions of the headers 10—10. The length $L$ (FIG. 5) of the sleeves 42—42 must be such that, when the magnets 31—31 have been inserted therein from one side (FIG. 9) and when the platforms 11—11 of the headers have been fully received therein from the opposite side, a definite clearance exists between magnets 31—31 and the upper surfaces of the headers 10—10. In the illustrative embodiment of the invention, this clearance is about 5–10 mils.

The retaining plate 40 is also provided with a set of four aligning pins 43—43 at the four corners of the plate. The pins 43—43 project from the plate 40 in both directions, as illustrated in FIG. 5, to permit entry into the locating holes 28—28 of the work holder 20 and the corresponding locating holes 32—32 of the transfer plate 30 to permit precise alignment of the three units.

V.—Method of operation

In operation, the retaining plate 40 is positioned above the fully loaded work holder 20 in a first orientation. At this time, the sleeves 42—42 face and are aligned with a first half of the headers 10—10 comprising every other one, due to the checkerboard arrangement of the sleeves 42—42. Generally speaking, it is immaterial which half of the articles is removed first so, at this time, it is only necessary to position the retaining plate 40 in any of the four possible orientations with the lower ends of the aligning pins 43—43 opposite to the locating holes 28—28 in the work holder 20.

After this, the retaining plate is moved into engagement with the work holder 20 until the lower ends of the aligning pins 43—43 enter the locating holes 28—28 and come to a stop against the bottoms of those holes. This is the position illustrated in FIG. 9. As this movement takes places, the sleeves 42—42 enter the nests 21—21 and surround the platforms 11—11.

Next, the transfer plate 30 is moved down into engagement with the retaining plate 40, with the locating holes 32—32 being impaled by the upper ends of the aligning pins 43—43 and the magnets 31—31 entering the sleeves 42—42 from above, to the rest position illustrated in FIGS. 2 and 9. The orientation of the transfer plate 30 is dictated by that of the retaining plate 40. As this movement takes place, the magnets 31—31 attract the headers 10—10 to draw them out of the nests 21—21 and toward the magnets, until the flanges 17—17 are intercepted by the lower edges of the sleeves 42—42. After this the headers 10—10 are retained against the sleeves by magnetic force out of contact with the magnets due to the 5–10 mil clearance provided by properly setting the length $L$ of the sleeves 42—42.

During this step, all of the headers 10—10 are attracted toward the bases of their nests by the magnetic base plate 50, with a force substantially less than the maximum force exerted by the magnets 31—31 to insure that the headers not being removed in the first stage remain in their nests as the first half of the headers are removed. The retaining plate 40 is placed in position first, primarily to insure that the headers 10—10 are drawn straight up toward the magnets.

Next, the transfer and retaining plates 30 and 40 are moved, as a unit, away from the work holder 20 to draw the first half of the headers 10—10 out of the nests 21—21. The work holder 20, with the first half of the headers removed, is depicted in FIG. 10. The plates 30 and 40 are turned over and set on the support pins 33—33, the position shown in FIG. 11, such that the headers 10—10 just removed are supported by the sleeves 42—42 with the leads 14—14 up. An operator then detaches the headers 10—10 individually from the retaining plate 40, by grasping the lead wires 14—14 with the fingers. The increased spacing of the headers 10—10 after removal makes possible the detachment and further handling of each individual header.

Finally, the retaining plate 40 is again engaged with the work holder 20 as previously described, but this time are rotated 90° in either direction from the previous orientation to a second orientation in alignment with the remaining half of the headers 10—10, after which the transfer plate 30 is again engaged with the retaining plate 40 to remove the remaining half of the headers 10—10 from the work holder 20.

VI.—Alternative arrangements

While one specific embodiment of the invention has been described in detail hereinabove, it will be obvious that various modifications may be made from the specific details described without departing from the spirit and scope of the invention. In particular, while the invention is particularly advantageous for use in the handling of articles having at least an outer surface of paramagnetic material, so that removal may be accomplished by the use of magnets, the invention may be practiced in much the same way using vacuum pick-up members for drawing the articles out of the nests. One specific arrangement in accordance with the principles of this invention is disclosed in applicant's copending application, Serial No. 400,823, filed October 1, 1964, the same date as this application.

While it is preferred to use attractive pick-up members (magnetic or vacuum), the broader principles of the invention with respect to the removal of articles into spaced stages could also be practiced with contacting pick-up members, such as adhesive-coated elements, arranged to pick up half of the articles at a time in corresponding fashion.

What is claimed is:
1. The method of removing an even-numbered group of at least four articles from a plurality of nests in a work holder in two stages such that half of the articles comprising every other one are removed in the first stage and the remaining half are removed in the second stage, the nests being arranged in the work holder in a predetermined regular pattern, which method comprises:

(a) positioning a transfer plate opposite to the work holder in a first orientation, the transfer plate having a plurality of article pick-up members which are equal in number to half the number of nests and which are arranged on the transfer plate in a predetermined pattern based on the pattern of the nests so that the pick-up members are aligned with a first half of the articles comprising every other one when the transfer plate is in the first orientation;

(b) moving the work holder and the transfer plate in the first orientation relatively together and then apart so that the pick-up members remove the first half of the articles from the work holder;

(c) detaching the first half of the articles from the pick-up members;

(d) positioning the transfer plate opposite to the work holder in a second orientation in which the pick-up members are aligned with the remaining half of the articles in the nests; and (e) moving the work holder and the transfer plate in the second orientation relatively together and then apart so that the pick-up members remove the remaining half of the articles from the work holder.

2. The method as recited in claim 1, wherein:
the nests are arranged at equally spaced intervals in a square grid pattern having an identical even number of rows and columns; and
the pick-up members are arranged on the transfer plate in an equally spaced checkerboard pattern corresponding to every other one of the nests.

3. The method as recited in claim 1, wherein the articles are removed from the nests by an attractive force exerted by the pick-up members, which draws the articles out of the nests and toward the pick-up members.

4. The method as recited in claim 3, wherein the attractive force is magnetic; the articles having outer surfaces of paramagnetic material, and the pick-up members being magnets mounted on a transfer plate of nonmagnetic material.

5. The method as recited in claim 3, further including the step of attracting all of the articles toward the bases of the nests with a lesser force than the maximum force exerted by the pick-up members to insure that the articles not being removed in the first stage remain in their nests as the work holder and transfer plate are moved relatively together and then apart to remove the first half of the articles from the work holder.

6. The method as recited in claim 3, further including the step of intercepting the articles as they are attracted toward the pick-up members and retaining the articles in positions where they are spaced from the pick-up members.

7. Apparatus for removing an even-numbered group of at least four articles from a plurality of nests in a work holder in two stages such that half of the articles comprising every other one are removed in the first stage and the remaining half are removed in the second stage, the nests being arranged in the work holder in a predetermined regular pattern, which apparatus comprises:

a transfer plate having a plurality of article pick-up members thereon which are equal in number to half the number of nests and which are arranged on the transfer plate in a predetermined pattern based on the pattern of the nests so that the pick-up members may be aligned with a first half of the articles comprising every other one by positioning the transfer plate opposite to the work holder in a first orientation, and so that the pick-up members may be aligned with the remaining half of the articles by positioning the transfer plate opposite to the work holder in a second orientation, the pick-up members being designed to remove the half of the articles with which they are aligned from the work holder by moving the work holder and the transfer plate relatively together and then apart, the pick-up members being further designed to permit detaching of the articles therefrom.

8. The apparatus as recited in claim 7, wherein:
the nests are arranged at equally spaced intervals in a square grid pattern having an identical even number of rows and columns; and
the pick-up members are arranged on the transfer plate in an equally spaced checkerboard pattern corresponding to every other one of the nests.

9. The apparatus as recited in claim 7, wherein the pick-up members comprise elements capable of exerting an attractive force on the articles to draw them out of the nests and toward the pick-up members.

10. The apparatus as recited in claim 9, wherein the pick-up members comprise magnets, the articles have outer surfaces of paramagnetic material, and the transfer plate is of nonmagnetic material.

11. The apparatus as recited in claim 9, further including means for attracting all of the articles toward the bases of the nests with a lesser force than the maximum force exerted by the pick-up members to insure that the articles not being removed in the first stage remain in their nests as the work holder and transfer plate are moved relatively together and then apart to remove the first half of the articles from the work holder.

12. The apparatus as recited in claim 9, further including means for intercepting the articles as they are attracted toward the pick-up members and for retaining the articles in positions where they are spaced from the pick-up members.

13. Apparatus for removing an even-numbered group of at least four articles from a plurality of nests in a work holder in two stages such that half of the articles comprising every other one are removed in the first stage and the remaining half are removed in the second stage, each of the articles as seated in its nests having an upper portion of paramagnetic material and having an enlarged portion at a distance below the upper portion, the nests being arranged in the work holder in a predetermined regular pattern, which apparatus comprises:

(a) a transfer plate of nonmagnetic material having a plurality of magnets mounted thereon and projecting therefrom, the magnets being equal in number to half the number of nests and being arranged on the transfer plate in a predetermined pattern based on the pattern of the nests so that the magnets may be aligned with a first half of the articles comprising every other one by positioning the transfer plate opposite to the work holder in a first orientation, and so that the magnets may be aligned with the remaining half of the articles by positioning the transfer plate opposite to the work holder in a second orientation, the magnets being designed to remove the half of the articles with which they are aligned from the work holder by moving the work holder and the transfer plate relatively together and then apart, the magnets attracting the articles to draw them out of the nests and toward the magnets; and (b) a retaining plate of nonmagnetic material having a plurality of apertures therethrough corresponding to the magnets in number and spacing, the apertures being of sufficient size to permit partial entry of the magnets and of the upper portions of the articles therein, but not entry of the enlarged portions of the articles, the retaining plate being engaged with the transfer plate so that the magnets extend into the apertures from one side of the retaining plate and the open ends of the appertures face and are aligned with half of the articles in the nests, the articles being drawn by the magnets into the open ends of the apertures until the enlarged portions of the articles are intercepted by the retaining plate, after which these articles are held against the retaining plate by magnetic force, the length of each aperture in the retaining plate being such that a clearance exists between the magnet and the upper surface of the article, the articles being detached from the magnets after removal from the work holder.

14. Apparatus for removing an article from a nest in a work holder, the article as seated in the nest having an upper portion of paramagnetic material and having an enlarged portion at a distance below the upper portion, which apparatus comprises:

(a) a transfer plate of nonmagnetic material having a magnet mounted thereon and projecting therefrom, the magnet being designed to remove the article from the work holder by moving the work holder and the transfer plate relatively together and then apart, the magnet attracting the article to draw it out of the nest and toward the magnet; and (b) a retaining plate of nonmagnetic material having an aperture therethrough of sufficient size to permit partial entry of the magnet and of the upper portion of the article therein, but not entry of the enlarged portion of the article, the retaining plate being engaged with the transfer plate so that the magnet extends into the aperture from one side of the retaining plate and the open end of the aperture faces and is aligned with the article in the nest, the article being drawn by the magnet into the open end of the aperture until the enlarged portion of the article is intercepted by the retaining plate, after which the article is held against the retaining plate by magnetic force, the length of the aperture in the retaining plate being such that a clearance exists between the magnet and the upper surface of the article.

15. The apparatus as recited in claim 14, for use in removing an article having a cylindrical upper portion and an enlarged circular flange at a distance below the upper portion from a nest constituting a cylindrical well within which the article is received with the flange seated at the bottom of the well, wherein:

the magnet is cylindrical; and the retaining plate includes a cylindrical sleeve mounted thereon and projecting therefrom, the sleeve having a cylindrical bore therethrough constituting the aperture within which the magnet and the upper portion of the article are received, the outer diameter of the sleeve being smaller than the diameter of the flange of the article so that the sleeve may be inserted into the well in the work holder and receive the upper portion of the article therein, but so that the flange is intercepted by the end of the sleeve as the article is drawn into the sleeve by the magnet.

References Cited by the Examiner

UNITED STATES PATENTS

| | | |
|---|---|---|
| 1,439,815 | 12/1922 | Haugh. |
| 2,510,555 | 6/1950 | Christie. |
| 2,858,597 | 11/1958 | Kraemer _____ 29—10 |
| 3,061,919 | 11/1962 | Tack _____ 29—428 |

HUGO O. SCHULZ, *Primary Examiner.*